United States Patent [19]
Darwin et al.

[11] Patent Number: 6,139,623
[45] Date of Patent: *Oct. 31, 2000

[54] EMULSIFIED COMB POLYMER AND DEFOAMING AGENT COMPOSITION AND METHOD OF MAKING SAME

[75] Inventors: David Charles Darwin, Columbia; Robert T. Taylor, Arnold; Ara A. Jeknavorian, Chelmsford; Ding Feng Shen, Lexington, all of Mass.

[73] Assignee: W. R. Grace & Co.-Conn., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/009,370

[22] Filed: Jan. 20, 1998

Related U.S. Application Data

[60] Provisional application No. 60/039,149, Jan. 21, 1997.

[51] Int. Cl.⁷ .............................. C09K 7/00; C04B 40/00
[52] U.S. Cl. ........................ 106/823; 523/130; 106/802; 524/5; 524/145; 524/263
[58] Field of Search ................................. 524/263, 145, 524/5, 701, 710, 762, 832; 106/823, 802, 90, 94, 104; 523/130

[56] References Cited

U.S. PATENT DOCUMENTS

| | | | |
|---|---|---|---|
| 3,817,949 | 6/1974 | Ribba | 260/80.3 E |
| 4,065,607 | 12/1977 | Kurowsky | 526/15 |
| 4,088,601 | 5/1978 | Shane et al. | 252/358 |
| 4,116,706 | 9/1978 | Previte | 106/90 |
| 4,200,563 | 4/1980 | Komiya | 260/29.6 SQ |
| 4,208,301 | 6/1980 | Gammon | 252/321 |
| 4,209,336 | 6/1980 | Previte | 106/90 |
| 4,229,224 | 10/1980 | Dawson et al. | 106/90 |
| 4,263,191 | 4/1981 | Eck et al. | 260/29.6 S |
| 4,338,239 | 7/1982 | Dammann | 524/549 |
| 4,471,100 | 9/1984 | Tsubakimoto et al. | 525/367 |
| 4,500,693 | 2/1985 | Takehara et al. | 526/240 |
| 4,589,995 | 5/1986 | Fukumoto et al. | 252/180 |
| 4,746,365 | 5/1988 | Babcock et al | 106/104 |
| 4,814,014 | 3/1989 | Arfaei | 106/90 |
| 4,946,506 | 8/1990 | Arfaei et al. | 106/724 |
| 4,946,904 | 8/1990 | Akimoto et al. | 525/327.3 |
| 4,948,429 | 8/1990 | Afraei | 106/659 |
| 4,960,465 | 10/1990 | Arfaei | 106/724 |
| 5,156,679 | 10/1992 | Gartner et al. | 106/808 |
| 5,358,566 | 10/1994 | Tanaka et al. | 106/823 |
| 5,369,198 | 11/1994 | Albrecht et al. | 526/240 |
| 5,393,343 | 2/1995 | Darwin et al. | 106/808 |
| 5,527,388 | 6/1996 | Berke et al. | 106/819 |
| 5,556,460 | 9/1996 | Berke et al. | 524/5 |
| 5,583,183 | 12/1996 | Darwin et al. | 525/329.4 |
| 5,633,298 | 5/1997 | Arfaei et al. | 524/5 |
| 5,634,066 | 5/1997 | Berke et al. | 106/14.41 |
| 5,643,978 | 7/1997 | Darwin et al. | 524/5 |
| 5,665,158 | 9/1997 | Darwin et al. | 106/808 |
| 5,703,174 | 12/1997 | Arfaei | 525/329.9 |
| 5,725,657 | 3/1998 | Darwin et al. | 106/808 |
| 5,728,207 | 3/1998 | Arfaei et al. | 106/709 |
| 5,912,284 | 6/1999 | Hirata et al. | 524/5 |

FOREIGN PATENT DOCUMENTS

| | | |
|---|---|---|
| 2125521 | 12/1994 | Canada . |
| 0056627 | 7/1982 | European Pat. Off. . |
| 0725043 | 8/1996 | European Pat. Off. . |
| 62-78137 | 4/1987 | Japan . |
| 175253 | of 1992 | Japan . |
| 175254 | of 1992 | Japan . |
| 1167524 | 10/1969 | United Kingdom . |
| 2280180 | 1/1995 | United Kingdom . |
| W/O 92/07010 | 4/1992 | WIPO . |
| W/O 97/00898 | 1/1997 | WIPO . |
| W/O 97/03929 | 2/1997 | WIPO . |

*Primary Examiner*—Veronica P. Hoke
*Attorney, Agent, or Firm*—Craig K. Leon; William L. Baker

[57] ABSTRACT

Exemplary emulsion admixture for use in hydraulic cement compositions formed by emulsifying an antifoaming agent, surfactant, and a comb polymer having a carbon-containing backbone to which are attached cement-anchoring members and oxyalkylene groups. A method of making a stable emulsion admixture comprising the comb polymer, as well as a hydraulic cement composition comprising the admixture, are also described.

27 Claims, No Drawings

EMULSIFIED COMB POLYMER AND DEFOAMING AGENT COMPOSITION AND METHOD OF MAKING SAME

This application is based on Provisional Application Serial No. 60/039,149 filed Jan. 21, 1997.

FIELD OF THE INVENTION

The present invention relates to chemical admixtures for use in hydraulic cement compositions such as concrete, and more particularly to an admixture composition formed by emulsifying an antifoaming agent with a "comb" polymer having a carbon-containing backbone to which are attached cement-anchoring members and oxyalkylene groups; a method of making a stable emulsion admixture comprising the comb polymer; and a hydraulic cement composition comprising the admixture.

BACKGROUND OF THE INVENTION

It is known to use comb polymers in hydraulic cement compositions. For example, in U.S. Pat. No. 5,393,343, incorporated fully herein by reference, Darwin et al. disclosed an EO/PO type comb polymer useful as a superplasticizer for retaining in concrete a high degree of slump (e.g., high flowability) over a sustained period of time without imparting significant set retardation. As used herein, the term "EO/PO" is synonomous with the term "oxyalkylene group" and serves as a convenient short-hand to designate polyoxyalkylene groups (e.g., ethylene oxide/propylene oxide copolymers). Thus, for present purposes, the term "EO/PO type comb polymer" means and refers to a polymer having a carbon backbone to which are attached pendant carboxylate groups (which function as cement anchoring groups in the cementitious mixture) and also comparatively longer pendant groups or "combs" such as ethylene oxide (EO) groups, propylene oxide (PO) groups, and/or a combination of EO/PO groups. The pendant groups may be ionic or non-ionic.

U.S. Pat. No. 5,393,343 also disclosed that a variety of conventional cement additives, such as "antifoaming agents," may be mixed with the cement composition prior to, along with, or subsequent to the addition of the superplasticizer. It is know that EO/PO type comb polymers commonly entrain excessive air in the cementitious mixture, and thus antifoaming agents were needed. Antifoaming agents exhibit very limited stability in aqueous solutions because they are hydrophobic and tend to separate in the liquid admixture solution which contains the comb polymer. Commonly used antifoaming agents (or "defoamers") include EO/PO type defoamers (especially ones rich in PO units), silicones, tri-butyl phosphate, and alkylphthalates. The phase instability of the comb polymer and antifoaming agent combination requires that they be placed into separate tanks and mixed just before incorporation into the cement composition (e.g., concrete), or, alternatively, that they be contained in a tank requiring constant stirring. In any event, the admixture solution has a short shelf life, creating inconvenience and added expense for the concrete preparation operation.

European Patent Application No. 0 725 043 (A2) of Sandoz Ltd. teaches that antifoaming agents, such as certain polyalkylene glycols or derivatives thereof, can be grafted as side chains directly onto a carbon backbone along with side chains comprising an oligoalkyleneglycol and/or polyalcohol to form the comb polymer. This approach relies on reproducible hydrolysis of the ester linkage to allow predictable release of the defoaming agent from the carbon-containing backbone.

UK Patent 2 280 180 A owned by Sandoz Ltd. disclosed the use of a polymer, which comprised units derived from unsaturated carboxylic acid monomers, in an aqueous solution wherein an oxyalkylene-based defoaming agent present during the polymerization of the monomers becomes dissolved or dispersed in particles of no greater than 20 $\mu$M diameter. Such a dispersion, however, may be phase unstable at elevated temperatures and during prolonged storage. Commonly known concrete defoamers, such as tri-butyl phosphate, even when dispersed are known to coalesce and phase-separate.

In view of the foregoing disadvantages of the prior art, a novel concrete admixture comprising an EO/PO type comb polymer and antifoaming agent, which allows for predictable air control, and method for making the same, are needed.

SUMMARY OF THE INVENTION

In surmounting the disadvantages of prior art, the present invention provides an emulsion admixture composition for hydraulic cement compositions comprising: (a) a comb polymer having a carbon-containing backbone to which are attached both cement-anchoring members such as carboxylic or carboxylate groups and oxyalkylene groups attached for example, by linkages selected from the group consisting of an amide, an imide, an ester, and/or an ether; (b) an antifoaming agent emulsified with said comb polymer, said antifoaming agents being selected from the group consisting of a composition having the formula $(PO)(O-R)_3$ wherein R is a $C_2$–$C_{20}$ alkyl group, a phosphate ester, an alkyl ester, a borate ester, a silicone derivative, and EO/PO type defoamer; and (c) one or more surfactant(s) operative to stabilize said emulsified comb polymer and said antifoaming agent, said surfactant-stabilizers being selected from the group comprising (1) an esterified fatty acid ester of a carbohydrate selected from the group consisting of a sugar, sorbitan, a monosaccharide, a disaccharide, and a polysaccharide, (2) a $C_2$–$C_{20}$ alcohol containing ethylene oxide and propylene oxide ("EO/PO") groups, and (3) mixtures of such.

The term "cement anchoring" is meant to refer to ionic bonds formed between the polymer's carboxylic(ate) groups and the calcium cations present n the cement when the admixture is admixed into a wet cementitious mix, while the "EO/PO" pendant "comb" groups on the polymer backbone are believed to facilitate the distribution of cement particles within an aqueous cementitious mix. Exemplary comb polymers comprise a backbone formed from ethylenically-unsaturated monomers, and, as pendant groups on the backbone, ethylene oxide (EO) groups, propylene oxide (PO) groups, or EO/PO groups in combination.

An exemplary surfactant comprises an esterified fatty acid ester of a carbohydrate, preferably sorbitan monooleate.

Surprisingly, the inventors have discovered that by emulsifying the comb polymer, antifoaming agent, and surfactant together, simultaneously in one step, a stable admixture composition be obtained. In other words, all three of these critical components—comb polymer, antifoaming agent (not grafted onto comb polymer), and surfactant—must be simultaneously present during the emulsification process to achieve fine emulsified droplets which remain homogeneously distributed throughout the aqueous phase. Thus, a conventional antifoaming agent such as tri-butylphosphate, which otherwise does not by itself form a stable emulsion in water with the surfactant, is able to form a synergistic emulsion of EO/PO-type comb polymer/antifoaming agent microdroplets.

Accordingly, an exemplary method of the invention comprises the emulsification of all three of these critical components, along with an appropriate amount of dilution water (e.g., 40–90% by weight), wherein the amount of comb polymer is 80–98.9% (dry wt), the amount of antifoaming agent is 1–15% (dry wt), and the amount of surfactant is 0.05–10.0%, preferably 0.1–5.0% (dry wt), in one step to obtain a liquid admixture composition which exists as a stable emulsion. Optionally, it is believed that the comb polymer may comprise pendant groups having defoaming properties in addition to the antifoaming agent (component "b") which is separate from the comb polymer but which must be present during the emulsion process, as aforesaid, in order to combine with the comb polymer and surfactant to form the microdroplets. The present invention also relates to cement compositions containing the above admixture. Further features and advantages of the invention are described hereinafter.

DETAILED DESCRIPTION OF EXEMPLARY EMBODIMENTS

The term "cement composition" as may be used herein refers to pastes, mortars, grouts such as oil well cementing grouts, and concrete compositions comprising a hydraulic cement binder. The terms "paste", "mortar" and "concrete" are terms of art: pastes are mixtures composed of a hydraulic cement binder (usually, but not exclusively, Portland cement, Masonry cement, or Mortar cement and may also include limestone, hydrated lime, fly ash, blast furnace slag, and silica fume or other materials commonly included in such cements) and water; mortars are pastes additionally including fine aggregate, and concretes are mortars additionally including coarse aggregate. The cement compositions of this invention may be formed by mixing required amounts of certain materials, e.g., a hydraulic cement, water, and fine or coarse aggregate, as may be applicable to make the particular cement composition being formed.

Exemplary emulsion admixtures of the invention are aqueous solutions comprising, in addition to dilution water, (a) a comb polymer a polymer backbone to which are attached carboxyl cement anchoring groups and non-ionic pendant groups; (b) an antifoaming agent emulsified with the comb polymer; (c) and a surfactant operative to provide a stable emulsion of the comb polymer and antifoaming agent. These three critical components, which are described in further detail hereinafter, are present in the following amounts, based on dry weight in the aqueous admixture solution (which thus comprises dilution water): comb polymer (80–98.9%); antifoaming agent (1–15%); and surfactant (0.1–5%). More preferably, the comb polymer is present, based on dry weight in the admixture composition, in the amount of 84–97.5%; the antifoaming agent is present in the amount of 2–12%; and the surfactant is present in the amount of 0.5–4%. Most preferably, the relative amounts are: comb polymer 88–94.3%; antifoaming agent 5–10%; and surfactant 0.75–2%.

Exemplary comb polymers (having pendant EO/PO groups) suitable for use in the present invention comprise acrylic polymers or copolymers thereof, which may be imidized, such as those taught in U.S. Pat. No. 5,393,343 assigned to W. R. Grace & Co.-Conn. and incorporated herein by reference. The polymer which may be imidized is an "acrylic polymer," by which term is meant, for example, a homopolymer or copolymer of acrylic acid, methacrylic acid, their alkali metal salts, as well as their $C_1$–$C_{30}$ alkyl esters. Additionally, the acrylic polymer reactant and the resultant imidized acrylic polymer may contain units derived from other singly and doubly ethylenically unsaturated monomers, such as styrene, alpha-methystyrene, sulfonated styrene, maleic acid, acrylonitrile, butadiene and the like. Such other ethylenically unsaturated monomer derived units, when present, can be present in the polymer in amount of up to about 20 (preferably, up to about 10) weight percent of the total polymer, provided that the resultant imidized acrylic polymer is water soluble.

An exemplary imidized acrylic polymer may be formed such as by reacting an acrylic polymer with ammonia or an alkoxylated amine. The amine reactant useful in forming the desired acrylic polymer can be selected from ammonia or an alkyl-terminated alkoxy amine represented by the formula:

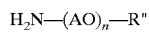

in which BO represents a $C_2$–$C_{10}$ (preferably a $C_2$–$C_4$) oxyalkylene group in which O represents an oxygen atom and A represents a $C_2$–$C_{10}$ (preferably a $C_2$–$C_4$) alkylene group or mixture; and R" represents a $C_1$–$C_{10}$ (preferably $C_1$–$C_4$) alkyl group and n is an integer selected from 1 to 200 and preferably from 1 to 70. The reaction conditions and catalysts are generally known. See e.g., U.S. Pat. No. 5,393,343 at Columns 3–4.

An exemplary acrylic comb polymer, preferably one that is imidized, that is suitable for use as comb polymer in the present invention comprises a carbon containing backbone to which is attached groups shown by the following structures (I) and (II) and optionally structures (III) and (IV):

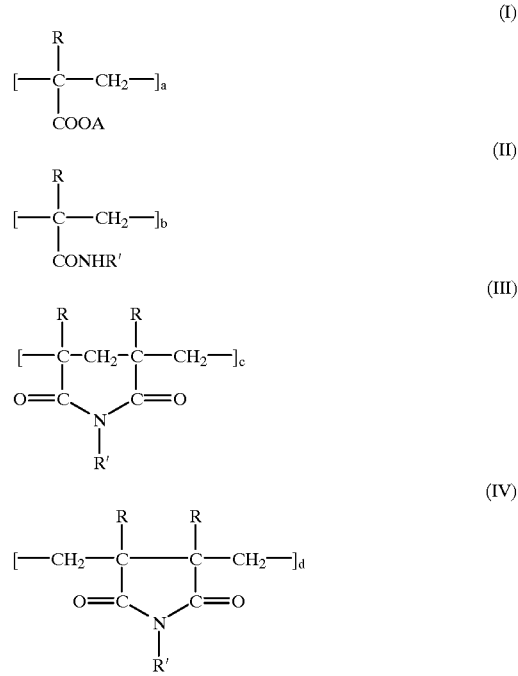

wherein each R independently represents a hydrogen atom or a methyl group (—$CH_3$) group; A represents hydrogen atom, a $C_1$–$C_{10}$ alkyl group, R' or an alkali or alkaline earth metal cation, an alkanolamine, or a mixture thereof; R' represents a hydrogen atom or a $C_2$–$C_{10}$ oxyalkylene group represented by $(AO)_nR''$ in which O represents an oxygen atom, A represents a $C_2$–$C_{10}$ alkylene group, R" represents a $C_1$–$C_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100-a) and is preferably from 3 to 10; and b is not more than [100-(a+c+d)].

In further exemplary imidized acrylic polymers, A is a hydrogen atom, an alkali or alkaline earth metal cation; R' is at least from 50–90 weight percent of the polymer and comprises polyoxyethylene or polyoxypropylene units or mixtures thereof. Further, a may have a numerical value of from 60–70, and the sum of c and d is a numerical value of at least 3 (preferably at least 5) to the value of (100-a).

Further exemplary comb polymers of the invention can be obtained by polymerization of ethylenically-unsaturated carboxylic acids to form the backbone, and grafting or otherwise attaching to the backbone a number of other non-ionic pendant groups. The backbone may comprise carboxylic acid grafting sites to which are covalently attached air-detraining functional side chains. The carbon backbone may optionally contain intervening atoms like oxygen (i.e., ether linkage). Suitable grafting sites include free carboxylic acid (or salt thereof) groups. Carbon backbones may be made by polymerization of ethylenically-unsaturated monomers, preferably ethylenically-unsaturated carboxylic acids (e.g., allyl carboxylic acids) such as acrylic, methacrylic, maleic, fumaric, citraconic, itaconic, (meth)allylsulfonic, vinyl sulfonic, sulfoethyl(meth)acrylic, 2-(meth)acrylamido 2-methylpropane sulfonic, mesaconic, or dicarboxylic acid half-esters. Preferred polycarboxylic acid carbon backbones are, e.g., polyacrylic or polymethacrylic acid. 5- to 200-mers are preferred, more preferably 5- to 150-mers, and 5- to 100-mers particularly preferred. Preferably about 5% or more of the carboxylic acid groups on the polycarboxylic acid backbone remain unesterified, more preferably about 10% or more.

Exemplary non-ionic pendant groups may comprise air detraining functional side chains which function chemically to stabilize entrained air quality and level in the cement or mortar, and are covalently attached to the grafting sites of the carbon backbone. (These pendant groups are not the same as the emulsified antifoaming agents being claimed herein). The side chains may comprise polyoxyalkylene groups of the general formula:

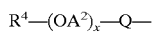

$$R^4\text{—}(OA^2)_x\text{—}Q\text{—}$$

wherein Q=O or NH;
$A^2$=$C_1$–$C_{10}$ alkylene;
x=1 to 200; and
$R^4$=$C_1$–$C_{10}$ alkyl.

The term alkylene is meant herein to encompass linear or branched alkylene groups, and also include (where structurally possible) arylene and arylalkylene groups. In preferred air detraining functional side chains, $A^2$=$C_2$–$C_5$ alkylene; more preferably, the $OA^2$ groups are a mixture of ethylene oxide ("EO") and propylene oxide ("PO"). Air detraining performance appears to be particularly good when the weight ratio of EO/PO in the air detraining functional side chain is from about 3:1 to 0.3:1, more preferably from about 1.5:1 to 0.6:1. Q is preferably O, and x is preferably 1 to 100. $R^4$ is advantageously butyl, preferably a n-butyl group. It is believed that a range of polyoxyalkylene alcohols available from Huntsman Chemical Corporation (Houston, Tex.) under the tradename JEFFOX will function suitable when incorporated as air detraining functional side chains in the comb polymers of the invention, e.g., JEFFOX WL5000 and WL660. These polyoxyalkylene alcohols have number average molecular weights of about 3500 and 1850, respectively, and have the formula $(C_4H_9)(OA^2)_xOH$, where $OA^2$ is a mixture of EO and PO, and the EO/PO weight ratio is ≈1:1.

Other exemplary polyoxyalkylene amines which can be grafted onto/attached to the carbon backbone of the comb polymers herein may have the general formula:

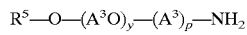

$$R^5\text{—}O\text{—}(A^3O)_y\text{—}(A^3)_p\text{—}NH_2$$

wherein $A^3$=$C_1$–$C_{10}$ alkylene;
y=1 to 200;
p=1 to 50; and
$R^5$=$C_1$–$C_{10}$ alkyl.

Such polyoxyalkylene amines may be grafted or attached to the carbon backbone by an amide and/or imide linkage, in which case the attached group would have the formula $R^5\text{—}O\text{—}(A^3O)_y\text{—}(A^3)_p\text{—}N$=(note that the "=" sign is meant to signify two covalent bonds to other atoms, for example, to two carbonyl carbons on the backbone, i.e., imide linkage, or to a hydrogen atom and a carbonyl carbon on the backbone.) In preferred polyoxyalkylene amines, $A^3$=$C_2$–$C_5$ alkylene; more preferably, the $A^3O$ groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. $R^5$ is preferably methyl ($CH_3$—). For example, polyoxyalkylene amines available from Huntsman Chemical Corporation (Houston, Tex.) under the tradename JEFFAMINE have been found suitable in the invention, e.g., JEFFAMINE M1000 and M2070, having number average molecular weights corresponding to their respective product numbers. The JEFFAMINES have the formula $CH_3O$ $(A^3O)_yCH_2CH(CH_3)NH_2$, where $A^3O$ is a mixture of EO and PO.

The mole ratio of the acrylic acid monomer in the polyacrylic acid to a) polyoxyalkylene amine and b) polyoxyalkylene alcohol can be generally about 2:1 to 9:1, and the weight ratio of a) to b) is generally about 20:1 to 2:1. It can easily be seen that by varying the amount of the polyoxyalkylene alcohol side chains grafted onto the backbone, exemplary comb polymers can be made in accordance with the invention which will produce corresponding variance in entrained air in the cementitious mix. One preferred comb polymer comprises polyacrylic acid ("PAA") to which has been grafted a) polyoxyalkylene amines of the formula $CH_3O$ $(A^3O)_yCH_2CH(CH_3)NH_2$, where $A^3O$ is a mixture of EO and PO and the EO/PO weight ratio is from about 5:1 to 0.5:1 and b) polyoxyalkylene alcohols of the formula $(C_4H_9)(OA^2)_xOH$, where $OA^2$ is a mixture of EO and PO and the EO/PO weight ratio is ≈1:1.

Further exemplary comb polymers of the invention may include polymers having the formula

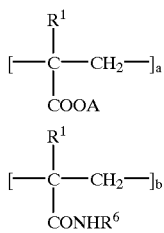

-continued

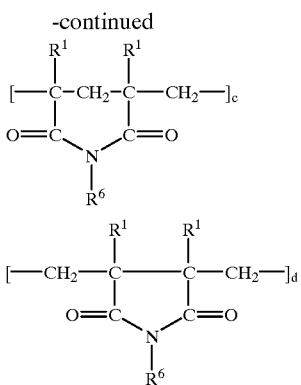

wherein each $R^1$ independently represents a hydrogen atom or a $C_1$–$C_5$ alkyl group; A represents a mixture of Z and $R^2$; Z represents hydrogen atom, monovalent or divalent metal cation, ammonium group or organic amine group; $R^2$ represents an air detraining polyoxyalkylene group represented by $(AO)_nR^3$ in which O represents an oxygen atom, A represents a $C_1$–$C_{10}$ alkylene group, $R^3$ represents a $C_1$–$C_{10}$ alkyl group and n represents an integer of from 1–200, or mixtures thereof; $R^6$ represents a polyoxyalkylene group represented by $(AO)_nR^3$; and a, b, c and d are numerical values representing molar percentage of the polymer's structure such that a is a value of about 1 to 99; the sum of c+d is a value of 0 to the numerical value of (100-a); and b is a remainder value of [100-(a+c+d)].

a is preferably from about 30 to 99, more preferably from 50 to 99. In the $R^2$ group, A preferably represents a $C_2$–$C_5$ alkylene group, $R^3$ represents a $C_1$–$C_4$ alkyl group, and n represents an integer of from 1–100. More preferably, the AO groups are a mixture of EO and PO. Air detraining performance appears to be particularly good when the weight ratio of EO/PO is from about 3:1 to 0.3:1, more preferably from about 1.5:1 to 0.6:1. $R^4$ is advantageously butyl, preferably a n-butyl group.

$R^6$ represents a polyoxyalkylene group represented by $(AO)_nR^3$, and is advantageously $R^5$—O—$(A^3O)_y$—$(A^3)_p$—, wherein $A^3$=$C_1$–$C_{10}$ alkylene; y=1 to 200; p=1 to 50; and $R^5$=$C_1$–$C_{10}$ alkyl. Preferably, $A^3$=$C_2$–$C_5$ alkylene; more preferably, the $A^3$O groups are a mixture of EO and PO. An EO/PO weight ratio of about 7:1 to 0.5:1 has been found suitable. y is preferably in the range of 1 to 100. p is preferably in the range of 1 to 5, more preferably 1 to 2. $R^5$ is preferably methyl ($CH_3$—). In a particularly preferred embodiment, a) $R^6$ is of the formula $CH_3O$ $A^3O)_yCH_2CH(CH_3)$—, where $A^3O$ is a mixture of EO and PO, and the EO/PO weight ratio is from about 5:1 to 0.5:1, and b) $R^2$ is of the $(C_4H_9)(OA^2)_xO$—, where $OA^2$ is a mixture of EO and PO and the EO/PO weight ratio is ≈1:1.

The exemplary comb polymer may be made by grafting a polyoxyalkylene amine onto a polycarboxylic acid backbone (amidization/imidization reaction), then grafting onto the polycarboxylic acid backbone an air detraining polyoxyalkylene alcohol (via esterification reaction). It is believed that the alcohol may also be grafted onto the backbone before grafting the amine onto the backbone. The reactions are carried out in an oxygen-free atmosphere, in a reaction vessel having a condenser for facilitating water removal, e.g., a jacketed-coiled condenser fitted with a Dean-Stark trap. (During the course of the reactions, water (a reaction by-product) is removed to drive the reaction to completion.) In the amidization/imidization step, the reactants which are contacted with each other and heated to 100° C. to about 185° C. for about 1 to 8 hours, preferably about 1.5 to 2.5 hours, or until the amidization/imidization is complete. (Again, reference is made to U.S. Pat. No. 5,393,343, the entire disclosure of which is incorporated herein by reference for further details of the reaction.) For the esterification reaction, a catalyst is added to catalyze the esterification of the polyoxyalkylene alcohol to the graft polymer. Any agent which will catalyze ester formation may be used (i.e., dehydrating agents, defined herein as those which facilitate the formation of water in chemical reactions; such as naphthalene sulfonic acid, carbodiimide, or p-toluene sulfonic acid), with p-toluene sulfonic acid preferred. The temperature is maintained at 100° C. to about 185° C. for about 1 to 8 hours, preferably about 1.5 to 2.5 hours, or until the esterification is complete. Water by-product is removed as above. The reaction vessel is cooled, the reaction product is neutralized and the total solids of the mixture are adjusted with solvent if desired or necessary for addition to a cement composition in a desired dosage. Other methods of preparation may be used as long as the resultant polymer has the characteristics described herein. For example, certain comb polymers (containing EO/PO groups) of the type obtained by polymerization of ethylenically-polymerizable carboxylic acids and ethylenically-polymerizable polyoxyalkylenes, as exemplified by U.S. Pat. Nos. 4,471,100 and 4,946,904, the entire disclosures of which are incorporated herein by reference, comprise a carbon backbone and grafting sites (carboxylic acid groups). It is intended that air detraining functional side chains as described herein may be esterified to the free carboxylic acid groups of these comb polymers containing pendant polyoxyalkylene groups to impart the benefits detailed herein. Such resulting comb polymers are intended to be within the scope of our invention.

Further exemplary comb polymers suitable for use in the present invention comprise a copolymer of a polyoxyalkylene derivative as represented by the following formula (1) and maleic anhydride, a hydrolyzed product of the copolymer, or a salt of the hydrolyzed product;

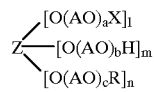

wherein "Z" represents a residue of a compound having from 2 to 8 hydroxy groups; "AO" represents an oxyalkylene group having from 2 to 18 carbon atoms; "X" represents an unsaturated hydrocarbon group having from 2 to 5 carbon atoms; "R" represents a hydrocarbon group having from 1 to 40 carbon atoms; "a" represents 1 to 1,000; "l" represents 1 to 7, "m" represents 0 to 2; and "n" represents 1 to 7; "l"+"m"+"n"=2 to 8, "m"/("l"+"n") is less than or equal to ½, and "al"+"bm"+"cn" is equal to or greater than 1. The copolymer shown above is taught in U.S. Pat. No. 4,946,904, issued to Akimoto et al. (and assigned to NOF), which patent is incorporated by reference as if fully set forth herein.

Another exemplary comb polymer suitable for use in the present invention is disclosed in U.S. Pat. No. 5,369,198, owned by Chemie Linz Gessellshaft m.b.H., incorporated herein by reference. Such comb polymers are composed of the following structural elements:

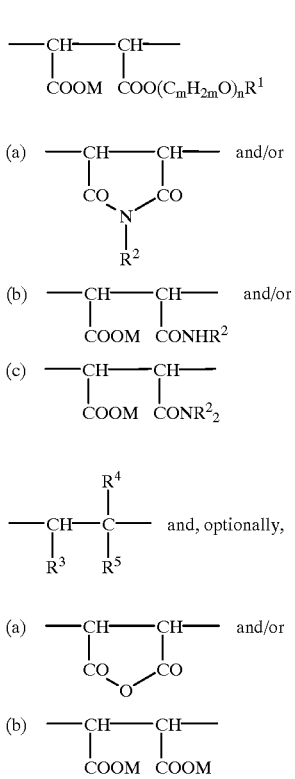

whereby M represents H or a cation such as alkaline or alkaline-earth metal, an ammonium group, or the residue of an organic amino group; $R^1$ represents $C_1$ to $C_{20}$ alkyl, $C_5$ to $C_8$ cycloalkyl or aryl group residue; $R^2$ represents H, $C_1$ to $C_{20}$ alkyl or hydroxyalkyl, $C_5$ to $C_8$ cycloalkyl or aryl group residue in which 1 or more H atoms can be substituted by the structural elements —COOM, —$SO_3M$ and/or $PO_3M_2$, as well as structural units of the General Formula $(C_mH_mH_{2m}O)_nR^1$, which optionally can be repeated; $R^3$ represents H, a methyl or methylene group which can be substituted if necessary and which forms a 5 to 8-member ring or an indene ring which includes $R^5$; $R^4$ represents H, a methyl or ethyl group; $R^5$ represents H, $C_1$–$C_{20}$ alkyl, $C_5$–$C_8$ cycloalkyl or aryl group residue, an alkoxy carbonyl group, an alkoxy group, an alkyl or aryl carboxylate group, a carboxylate group, a hydroxyalkoxy carbonyl group; m represents a whole number from 2 to 4; and n represents a whole number from 0–100, preferably from 1–20. Methods for making the aforementioned copolymer are provided in U.S. Pat. No. 5,369,198, incorporated herein by reference.

Another exemplary comb polymer suitable for use in the present invention comprises water-soluble linear copolymers of N-vinylamides with monomeric addition products of amines, amino acids, amino groups containing aromatic sulfonic acids, amino alcohols of maleic anhydride as well as maleic esters of polyoxyalkyleneglycols or their monoethers. One structural unit is represented by Formula (A) or by Formula (B); the other partial structure unit being represented by Formula (C):

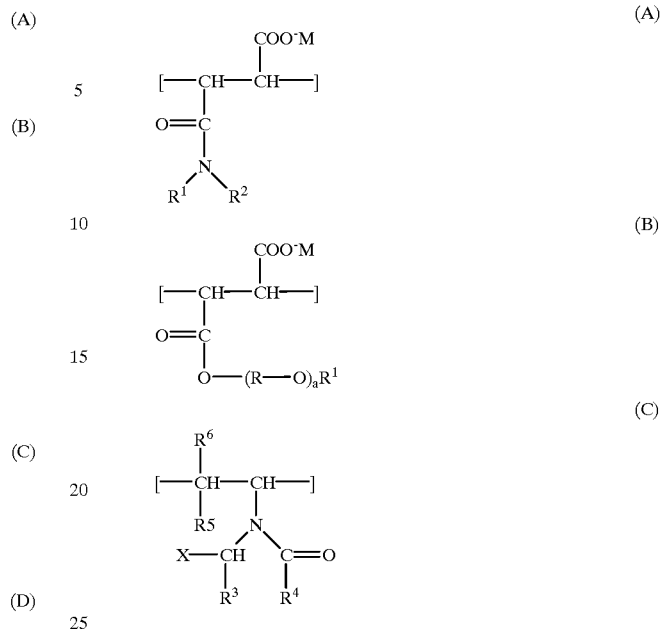

wherein $R^1$ and $R^2$, which may be the same or different, each represent hydrogen, a $C_1$–$C_{20}$ alkyl residue which may optionally include alkali metal carboxylate or alkaline earth metal carboxylate groups, an aromatic group, an aliphatic or cycloaliphatic residue which may optionally include sulfonic acid groups or alkali metal sulfonate or alkaline earth metal sulfonate groups, a hydroxyalkyl group, preferably a hydroxy ethyl- or hydroxypropyl group, or may together with the nitrogen atom to which they are bound, form a morpholine ring; M represents a hydrogen ion, a monovalent or divalent metal ion or a substituted ammonium group; R represents a hydrogen atom or an alkyl group having 1 to 4 carbon atoms; p, q, and r are integers; a represents an integer ranging from 1 to 100; $R^3$ and $R^4$ which may be the same or different, each represent hydrogen, a $C_1$ to $C_{12}$-alkyl residue, a phenyl residue, or may together form a di-, tri-, or tetramethylene group, which form with the inclusion of the residue of the formula:

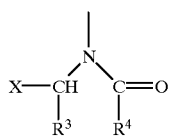

a five, six, or seven membered ring; $R^5$ and $R^6$ which may be the same or different, each represent hydrogen, a $C_1$ to $C_{12}$-alkyl residue or phenyl residue; and X represents hydrogen, a $C_1$ to $C_4$-alkyl residue, a carboxylic acid group, or an alkali metal carboxylate group. Such copolymer is known and taught in U.S. Pat. No. 5,100,984 issued to Burge et al., and assigned to Sika AG, which patent is incorporated fully by reference as if set forth herein.

A preferred antifoaming agent of the present invention has the formula $(PO)(O—R)_3$ wherein R is a $C_2$–$C_{20}$ alkyl group. More preferably, R is a $C_3$–$C_6$ alkyl group. A most preferred antifoaming agent is tri-butyl phosphate (e.g., tri-n-butyl phosphate), which is a hydrophobic oily liquid at ambient temperature. It is believed that other exemplary antifoaming agents suitable for use in the invention include phosphate esters (other than tri-butyl phosphate); alkyl esters (e.g., dibutyl phosphate); borate esters; silicone derivatives (e.g., polyalkyl siloxanes); and a polyoxyalkylene having defoaming properties, such as EO/PO type defoamers, especially ones rich with PO groups. An exemplary EO/PO defoamer is available from BASF under the tradename of PLURONIC 25-R2 and is believed to comprise an EO/PO block copolymer. It is believed that having an antifoaming agent emulsified in an aqueous solution is preferable when compared against prior art components in which the antifoaming agent is merely grafted onto a comb polymer or present as a non-homogenous disperions in the aqueous solution because the antifoaming agent is believed to be more readily available to control air in the mixture as a function of time.

A preferred surfactant-stabilizer of the present invention comprises an esterified fatty acid ester of a carbohydrate such as a sugar, sorbitan, a monosaccharide, a disaccharide, or polysaccharide. Sorbitan monooleate is most preferred, and is commercially available from ICI Specialty Chemicals under the tradename "SPAN." Another preferred surfactant-stabilizer of the invention comprises an alcohol having a chain length of $C_2$–$C_{20}$, and more preferably $C_{16}$–$C_{18}$, with an EO/PO ratio of less than 1. A suitable surfactant of this ethoxylated/propylated alcohol type is available from Huntsman under the tradename SURFONIC LF 27.

It has been found that use of the aforementioned fatty acid ester surfactant-stabilizers in the invention provides an additional advantage in that these products slowly hydrolize in the cement environment and entrain very fine air bubbles in the cement compositions to which the inventive emulsions are added. These fine air voids provide an excellent defense against damage to the cement compositions caused by alternate freezing and thawing of the cement compositions. Moreover, the use of $C_2$–$C_{20}$ EO/PO containing alcohols as surfactant-stabilizers has been found to further impact additional defoaming abilities to the emulsions of the invention, particularly during early hydration stages of the cement compositions to which the emulsions are added. Further, these EO/PO types when used with the fatty acid ester type surfactants in inventive emulsions and added to cement compositions containing conventional air-entraining agents such as gum rosins and "Vinsol" resins, provide set cement compositions which exhibit optimum air-void systems desired by the cement user. Thus the most preferred emulsions of the invention employ both of the aforedescribed fatty acid ester and EO/PO alcohol surfactant-stabilizers.

A most preferred emulsified admixture composition of the invention thus comprises (a) a comb polymer of the type described above (and in U.S. Pat. No. 5,393,343); (b) an antifoaming agent comprising tri-butyl phosphate (preferably tri-n-butyl phosphate); and (c) a surfactant comprising sorbitan monooleate, as well as a suitable amount of dilution water (e.g., 40–90% water by total mass). A cement composition of the invention comprises at least one hydratable cementitious binder, a comb polymer, an antifoaming agent, and a surfactant, as described above.

An exemplary method of the invention for making the emulsified admixture comprises blending together the comb polymer, antifoaming agent, and surfactant.

The present invention can be further appreciated in view of the following examples, which are provided for illustrative purposes only.

EXAMPLE 1

(Comparative Test)

An exemplary comb polymer having pendant oxyalkylene groups was made in accordance with the method described in U.S. Pat. No. 5,393,343. 1 mole of polyacrylic acid (mw 5000) was combined with 10 moles of a polyethylene-polypropylene oxide polymer (molecular weight 2000) (available from Huntsman under the tradename Jeffamine M-2070). The polyethylene-polypropylene oxide polymer used in this synthesis contained a primary amine group and a methyl group as the terminal groups. The mixture was heated and maintained at 180 degrees C, while under flowing nitrogen gas stream for a total of two hours. The water of solution and water formed as a by-product were removed. Upon cooling to ≈50° C., the reaction product was neutralized with 40% (wt/wt) aqueous NaOH and total solids adjusted to 30% to 40% with deionized water. The resulting product was an amber viscous liquid.

30% and 40% solutions of this comb polymer in water generated clear solutions. Tri-n-butyl phosphate, in the amount of 5% based on the weight of the polymer, was mixed into the solution, which was shaken. The resultant solution was cloudy. This solution was stored in a one foot long clear glass tube, and within a few days demonstrated phase separation caused by the tri-n-butyl phosphate floating to the top of the solution. The polymer provided a clear layer below.

EXAMPLE 2

(Comparative Test 2)

Another effort to blend the tri-n-butyl phosphate and comb polymer, of the kind and amounts described in Example 1, was undertaken using a Waring blender with emulsifier blades. Thus, 5% by weight (based on polymer) of the tri-n-butyl phosphate was mechanically blended into about 30% and 40% solutions of the comb polymer. However, the resultant solutions again showed phase separation within one week.

EXAMPLE 3

(Comparative Test 3)

Emulsification of a surfactant with the antifoaming agent, prior to addition of the comb polymer, did not render a stable emulsion. An emulsion was made using sorbitan monooleate (SPAN 80), an esterified fatty acid ester of sorbitan, in an amount of about 1% based on the weight of the comb polymer, with tri-n-butyl phosphate, added at 5% of the weight of the comb polymer, mixed into water. However, when the comb polymer was introduced into this previously made emulsion, the emulsion did not remain stable and phase separation was observed within one week.

Similarly, when the comb polymer and tributyl phosphate, such as made in Example 1, were emulsified together first, and then the sorbitan monooleate was subsequently added, phase separation was observed within one week.

EXAMPLE 4

Emulsions containing 30% and 40% solutions of the comb polymers prepared as in Example 1, were made, each using sorbitan monooleate added at 1% based on the weight of the comb polymer and tri-n-butyl phosphate added at 5% of the weight of the comb polymer. The emulsions were prepared by emulsifying the comb polymer, antifoam agent and surfactant together, simultaneously in one step. Upon emulsification, these solutions became turbid but remained stable over six months of storage at temperatures of 32–115° F. No phase instability was observed.

To test the effectiveness of one of the emulsion admixture produced in Example 4 above, microconcrete mortar tests were performed. Three samples were tested. The first sample (control) comprised a solution containing only the comb polymer (0.10% s/s). The second sample, for comparative purposes, comprised a comb polymer having a defoamer that was coupled by an ion pairing to the polymer (essentially a comb polymer similar to the one described in Example 1 above which was formulated using 3% by weight Jeffamine M-2005 defoamer available from Huntsman). The third sample (comb polymer, tri-butyl phosphate, and surfactant (sorbitan monooleate) was an emulsion as described in Example 4 above.

The three samples were admixed into a mixture of cement, sand, and water having a water/cement ratio of 0.42 and a sand/cement weight ratio of 3. Sample 1 was added into the mixture at 0.10% s/s (based on weight of the cement); while each of samples 2 and 3 (each having additional defoamer) were added at about 0.11% s/s (based on the weight of cement). The samples were then mixed for 5 minutes initially, and then one minute prior to measurements of slump and air content taken at 9, 18, 30, 45, and 60 minutes thereafter. Slump was measured in accordance with Japanese Standard JIS A-1173, and air content was measured in accordance with ASTM C 185 (1995). Results are provided in the Table 1 below.

TABLE 1

| Admixture | Slump (cm.) | | | | | Air Cup (%) | | | | | Time set |
|---|---|---|---|---|---|---|---|---|---|---|---|
| minutes: | 9 | 18 | 30 | 45 | 60 | 9 | 18 | 30 | 45 | 60 | min. |
| 1 comb only | 9.0 | 8.6 | 6.5 | 5.0 | 4.3 | 9.2 | 8.4 | 7.9 | 7.3 | 7.1 | 218 |
| 2 comb/defoam | 9.0 | 8.1 | 6.0 | 4.8 | 3.8 | 5.3 | 5.3 | 5.4 | 5.5 | 5.5 | 225 |
| 3 comb & tbp & SPAN | 9.3 | 8.6 | 5.8 | 4.8 | 4.1 | 4.8 | 4.4 | 4.8 | 4.2 | 4.3 | 227 |

The results demonstrated that sample 3, the emulsion admixture of the invention, eliminated a significant amount of air when compared to the control sample 1, and was as effective as sample 2 which was formulated with a defoamer (Jeffamine M-2005 which is rich in PO groups).

The foregoing examples are provided for illustration only and are not intended to limit the scope of the invention, as claimed.

EXAMPLE 5

An emulsion as described in Example 4 is prepared except that in addition to the comb polymer, sorbitan monooleate and tri-n-butyl phosphate ingredients, 1% (based upon the weight of the comb polymer) of a $C_{16}$–$C_{18}$ ethoxylated/propylated alcohol having an EO/PO ratio of less than 1 (e.g., such as avilable under the tradename Surfonic LF27) is included in the simultaneous emulsification step. The emulsion will exhibit stability similar to that of the emulsion of Example 4, and further hydrated cement compositions containing such will exhibit desired enhanced air void systems rendering them resistant to freeze-thaw damage.

We claim:

1. An emulsion admixture composition for hydraulic cement compositions, comprising:
    (a) a comb polymer operative as a plasticizer in hydratable cementitious compositions, said comb polymer having a carbon-containing backbone to which are attached pendant cement-anchoring members and oxyalkylene members, said oxyalkylene members comprising ethylene oxide groups, propylene oxide groups, or a mixture thereof, said comb polymer being in the amount of 80–98.9 dry wt. % dry based on solids content of the emulsion admixture;
    (b) an antifoaming agent emulsified with said comb polymer, said antifoaming agent in the amount of 1–15 dry wt. % based on solids content of the emulsion admixture, said antifoaming agent being selected from the group consisting of (i) a phosphate ester having the formula $P(O)(O-R)_3$ wherein P represents phosphorus, O represents oxygen, and R represents a $C_2$–$C_{20}$ alkyl group; (ii) a borate ester; and (iii) and a polyoxyalkylene copolymer having defoaming properties;
    (c) at least one surfactant in the amount of 0.05–10.0 dry wt. % based on solids content of the emulsion admixture, said at least one surfactant operative to stabilize said emulsion mixture, said surfactant comprising (i) an esterified fatty acid ester of a carbohydrate selected from the group consisting of a sugar, sorbitan, a disaccharide, and a polysaccharide; (ii) a $C_2$–$C_{20}$ alcohol having polyoxyalkylene groups; or (iii) a mixture thereof; and
    (d) water in the amount of 40 90 wt. % of the emulsion admixture.

2. The composition of claim 1 wherein said comb polymer is formed by reacting on acrylic polymer with ammonia or an alkoxylated amine represented by the formula:

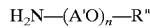

in which A'O represents a $C_2$–$C_{10}$ oxyalkylene group in which O represents an oxygen atom and A' represents a $C_2$–$C_{10}$ alkylene group; R" represents a $C_1$–$C_{10}$ alkyl group; and n is an integer selected from 1 to 200.

3. The composition of claim 2 wherein A' represents a mixture of ethylene oxide groups and propylene oxide groups.

4. The composition of claim 2 wherein R" represents a $C_1$–$C_4$ alkyl group.

5. The composition of claim 2 wherein n is an integer selected from 1 to 70.

6. The composition of claim 2 wherein said surfactant of component (c) comprises said esterified fatty acid ester and said $C_2$–$C_{20}$ alcohol.

7. The composition of claim 1 wherein said comb polymer is formed by reacting an acrylic polymer with ammonia or an alkoxylated amine represented by the formula:

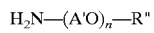

in which A'O represents a $C_2$–$C_{10}$ oxyalkylene group in which O represents an oxygen atom and A' represents a $C_2$–$C_4$ alkylene group or mixture; and R" represents a $C_1$–$C_4$ alkyl group, and n is an integer selected from 1 to 70.

8. The composition of claim 2 wherein said comb polymer comprises a carbon containing backbone to which is attached groups shown by the following structures (I) and (II) and optionally structures (III) and (IV):

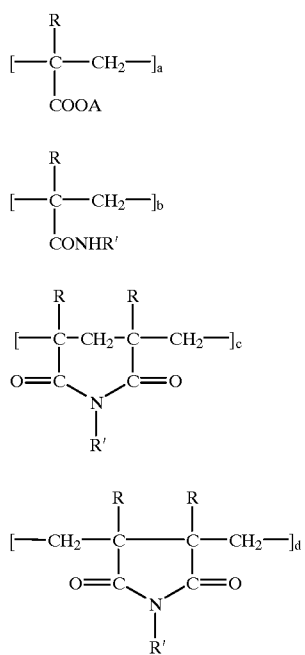

(I)

$$[-\overset{R}{\underset{COOA}{C}}-CH_2-]_a$$

(II)

$$[-\overset{R}{\underset{CONHR'}{C}}-CH_2-]_b$$

(III)

$$[-\overset{R}{\underset{O=C}{C}}-CH_2-\overset{R}{\underset{C=O}{C}}-CH_2-]_c$$
$$\underset{R'}{N}$$

(IV)

$$[-CH_2-\overset{R}{\underset{O=C}{C}}-\overset{R}{\underset{C=O}{C}}-CH_2-]_d$$
$$\underset{R'}{N}$$

wherein each R independently represents a hydrogen atom or a methyl group (—$CH_3$) group; A represents a hydrogen atom, a $C_1$–$C_{10}$ alkyl group, R' or an alkali or alkaline earth metal cation, an alkanolamine, or a mixture thereof; R' represents a hydrogen atom or a $C_2$–$C_{10}$ oxyalkylene group represented by $(A'O)_nR''$ in which O represents an oxygen atom, A' represents a $C_2$–$C_{10}$ alkylene group, R'' represents a $C_1$–$C_{10}$ alkyl and n is an integer of 1–200; and a, b, c, and d are numerical values representing molar percentage of the polymer's structure such that a is a value of about 50–70, the sum of c plus d is at least 2 to a value of (100-a), and b is not more than [100-(a+c+d)].

9. The admixture of claim 8 wherein said copolymer further comprises at least one group from the structures (III) and (IV).

10. The composition of claim 8 wherein said comb polymer is formed by reaching an acrylic polymer with ammonia, an alkoxylated amine or polyoxyalkylene alcohol to provide a functional side chain represents by the formula

$R^4$—$(OA^2)_x$—Q— wherein Q=O or NH;

$A^2$=$C_1$–$C_{10}$ alkylene group;

x=1 to 200; and $R^4$=$C_1$–$C_{10}$ alkyl group.

11. The composition of claim 10 wherein said comb polymer comprises a carbon-containing backbone having cement attaching groups and oxyalkylene groups attached to the backbone by a linkage selected from amide and imide, said groups having the structures (I) and (II), and optionally structures (III) and (IV):

(I)

$$[-\overset{R^1}{\underset{COOA}{C}}-CH_2-]_a$$

(II)

$$[-\overset{R^1}{\underset{CONHR^6}{C}}-CH_2-]_b$$

(III)

$$[-\overset{R^1}{\underset{O=C}{C}}-CH_2-\overset{R^1}{\underset{C=O}{C}}-CH_2-]_c$$
$$\underset{R^6}{N}$$

(IV)

$$[-CH_2-\overset{R^1}{\underset{O=C}{C}}-\overset{R^1}{\underset{C=O}{C}}-CH_2-]_d$$
$$\underset{R^6}{N}$$

wherein each $R_1$ independently represents a hydrogen atom or a $C_1$–$C_5$ alkyl group; A represents a mixture of Z and $R^2$; Z represents hydrogen atom, monovalent or divalent metal cation, ammonium group or organic amine group; $R^2$ represents an air detraining polyoxyalkylene group represented by $(A'O)_nR^3$ in which O represents an oxygen atom, A' represents a $C_1$–$C_{10}$ alkylene group, $R^2$ represents a $C_1$–$C_{10}$ alkyl group and n represents an integer of from 1–200, or mixtures thereof; $R^6$ represents a polyoxyalkylene group represented by $(A'O)_nR^3$; and a, b, c and d are numerical value representing molar percentage of the polymer's structure such that a is a value of about 1 to 99; the sum of c+d is a value of 0 to the numerical value of (100-a); and b is a remainder value of [100-(a+c+d)].

12. The admixture of claim 11 wherein said copolymer comprises an imidized acrylic polymer and further comprises at least one of the structures (III) and (IV).

13. The composition of claim 2 wherein said (a) comb polymer comprises a copolymer of a polyoxyalkylene derivative and a maleic anhydride.

14. The composition of claim 2 wherein said comb polymer comprises linear copolymers of N-vinylamides with addition products selected from the group consisting of amines, amino acids, amino groups containing aromatic sulfonic acids, amino alcohols of maleic anhydride, and maleic esters of polyoxyalkyleneglycols or their monoethers.

15. The composition of claim 2 wherein said comb polymer comprises (A)

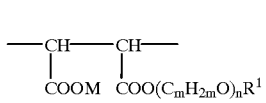

—CH——CH—
|       |
COOM  COO($C_mH_{2m}$O)$_nR^1$

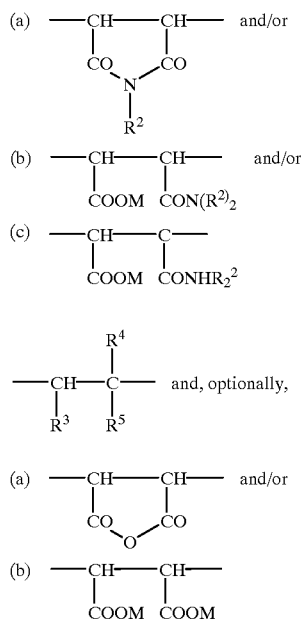

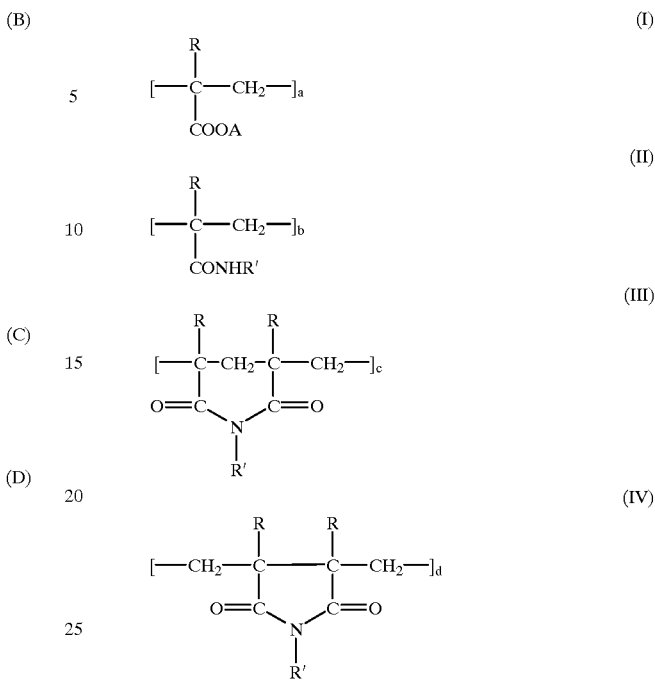

whereby M represents H or a cation such as alkaline or alkaline-earth metal, an ammonium group, or the residue of an organic amino group; $R^1$ represents $C_1$ to $C_{20}$ alkyl, $C_5$ to $C_8$ cycloalkyl or aryl group residue; $R^2$ represents H, $C_1$ to $C_{20}$ alkyl or hydroxyalkyl, $C_5$ to $C_8$ cycloalkyl or aryl group residue in which 1 or more H atoms can be substituted by the structural elements —COOM, $SO_3M$ and/or $PO_3M_2$, as well as structural units of the General Formula $(C_mH_{2m}O)_nR^1$, which optionally can be repeated; $R^3$ represents H, a methyl or methylene group which can be substituted if necessary and which forms a 5 to 8-member ring or an indene ring which includes $R^5$; $R^4$ represents H, a methyl or ethyl group; $R^5$ represents H, $C_1$–$C_{20}$ alkyl, $C_5$–$C_8$ cycloalkyl or aryl group residue, an alkoxy carbonyl group, an alkoxy group, an alkyl or aryl carboxylate group, a carboxylate group, a hydroxyalkoxy carbonyl group; m represents a whole number from 2 to 4; and n represents a whole number from 0–100.

16. The composition of claim 3 wherein said antifoaming agent has the formula $P(O)(O—R)_3$ wherein $R=C_2$–$C_{20}$ alkyl.

17. The composition of claim 15 wherein said antifoaming agent comprises tri-butyl phosphate.

18. The composition of claim 16 wherein said surfactant comprises sorbitan monooleate.

19. The composition of claim 16 wherein said surfactant comprises an alcohol having a carbon chain length of $C_2$–$C_{20}$ and polyoxyalkylene groups.

20. A method of making an emulsified composition for hydraulic cement compositions comprising: mixing together said comb polymer, said antifoaming agent, said surfactant, and said water of claim 1.

21. The method of claim 20 where said comb polymer comprises a carbon containing backbone to which is attached groups shown by the following structures (I) and (II) and optionally structures (III) and (IV):

wherein each R independently represents a hydrogen atom or a methyl group (—$CH_3$) group; A represents hydrogen atom, a $C_1$–$C_{10}$ alkyl group, R' or an alkali or alkaline earth metal cation, an alkanolamine, or a mixture thereof; R' represents a hydrogen atom or a $C_2$–$C_{10}$ oxyalkylene group represented by $(A'O)_nR''$ in which O represents an oxygen atom A' represents a $C_2$–$C_{10}$ alkylene group, R" represents a $C_1$–$C_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100-a); and b is not more than [100-(a+c+d)].

22. A cementitious composition comprising a hydratable cementitious binder and the composition of claim 1 consisting of an amide, an imide, an ester, and an ether; an antifoaming agent; and a surfactant.

23. The composition of claim 2 wherein said copolymer backbone comprises a carboxylic acid, an acrylic acid, a methacrylic acid, a maleic acid, a fumaric acid, a citraconic acid, an itaconic acid, a (meth)allylsulfonic acid, a vinyl sulfonic acid, or mixture thereof.

24. The composition of claim 2 wherein said components (a), (b), and (c) are formed into an emulsion by emulsifying all three of said components together with water of component (d) to achieve emulsified droplets homogeneously distributed throughout the water phase.

25. The composition of claim 2 wherein said comb polymer further comprises air detraining side chains which function to stabilize entrained air quality and level in cement or mortar, said side chains being covalently attached to said carbon-containing backbone.

26. The composition of claim 25 wherein said air detraining side chains comprise polyoxyalkylene groups having the general formula:

$$R^4\text{---}(OA_2)_x\text{---}Q\text{---}$$

wherein Q=O or NH;
 $A^2$=$C_1$–$C_{10}$ alkylene group;
 x=1 to 200; and
 $R^4$=$C_1$–$C_{10}$ alkyl group.

27. The composition of claim 25 wherein in said air detraining said chain polyoxyalkylene groups having said general formula $R^4$—$(OA_2)_x$—Q—, said polyoxyalkylene groups comprise ethylene oxide groups and propylene oxide groups in a ratio of from 3:1 to 0.3:1.

* * * * *